No. 628,758. Patented July 11, 1899.
A. V. CHARDON.
CHRONOMETER ESCAPEMENT.
(Application filed Oct. 27, 1897.)
(No Model.)
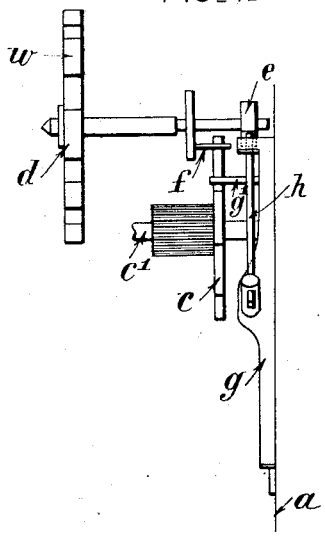
FIG_1_
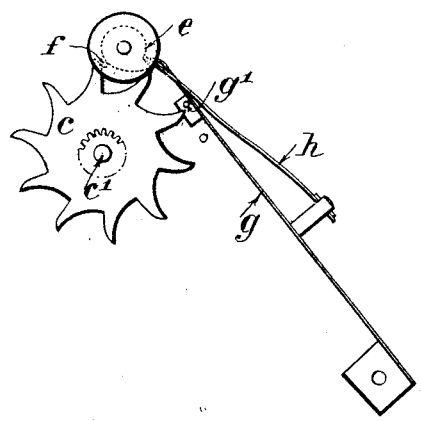
FIG_2_
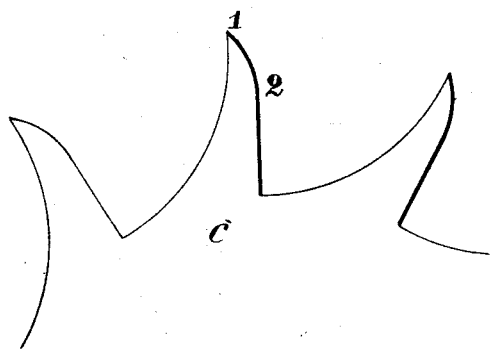
FIG_3_
WITNESSES.
INVENTOR:
A. V. Chardon
BY
ATTORNEYS.

UNITED STATES PATENT OFFICE.

ARTHUR VICTOR CHARDON, OF PARIS, FRANCE.

CHRONOMETER-ESCAPEMENT.

SPECIFICATION forming part of Letters Patent No. 628,758, dated July 11, 1899.

Application filed October 27, 1897. Serial No. 656,516. (No model.)

*To all whom it may concern:*

Be it known that I, ARTHUR VICTOR CHARDON, clock and watch mechanic, of 23 Rue de Bretagne, Paris, in the Republic of France, have invented new Improvements in Escapement Mechanism for Watches, (for which I have obtained Letters Patent of France for fifteen years, dated August 13, 1897;) and I do hereby declare that the following is a full and exact description thereof, reference being made to the accompanying drawings.

The invention has for its object to provide a simple, cheap, and yet reliable escapement mechanism for watches; and it consists in the particular construction and arrangement of parts hereinafter described and claimed.

Reference is to be had to the accompanying drawings, in which—

Figures 1 and 2 are detail views of the detent-escapement; and Fig. 3 is a part view, on a larger scale, of the escapement-wheel.

The parts of the mechanism are mounted on any suitable frame or support, such as a plate $a$.

The detent-escapement mechanism arranged at the upper part comprises an escapement-wheel $c$, having teeth of the particular shape described hereinafter, said wheel being mounted on a spindle $c'$, a balance-wheel $d$, on the spindle of which are fixed the unlocking-roller pin $e$, and the unlocking-roller carrying the driving-stud $f$ and the double-spring detent. The said double detent itself comprises the "detent" (properly so called) $g$, formed by stamped blade or blank and carrying the locking-stud $g'$ of the escapement-wheel, and the small detent-spring $h$, which is fixed in a post riveted on the lug $g$ and on the free end of which the unlocking-roller pin $e$ acts.

In detent-escapements as now used the flank of the tooth of the escapement-wheel which moves the balance-wheel is straight and is more or less in a radial direction. The result is that between the moment when the tooth meets the driving-stud and the moment when the said tooth leaves it there is a sliding movement of the said stud on the said tooth and bad driving, which interfere with the regular working of the parts. To obviate this, I have made an escapement-wheel of which the tooth has a curve formed so as to reduce friction at the part where it acts on the stud $f$. The said flank (shown at 1 2 in the drawings) is such that the stud $f$ slides on the tooth the whole of the time the two surfaces remain in contact with each other. With this arrangement the impulsion given by the tooth to the stud, and which impulsion is at every moment normal with the flank of the tooth at the point of contact, will always be tangent to the circumference described by the center of the stud—that is to say, that the driving will take place under conditions which are perfect and that the result will be a great smoothness and a great regularity in the movement.

It will be seen that the side or flank of the tooth is straight and approximately radial from its inner end to a circular line concentric with the escapement-wheel $c$ and passing through the point 2, where the tooth is adapted to be first engaged by the driving-stud $f$. From there outward the flank of the tooth is curved as described, the straight portion being tangential to the adjacent portion of the curve.

The double-spring detent of my system operates with great precision. The unlocking-roller pin $e$, carried by the balance-spindle, acts first on the small spring $h$ and raises simultaneously both the said spring $h$ and the "detent" $g$, properly so called. The locking-stud $g'$ releases the wheel $e$, which, beginning to turn, makes one of its teeth strike the driving-stud $f$. The balance turns in the reverse direction and the unlocking-roller pin forces the end of the small spring $h$ to bend down again under the said spring without acting on the detent. As soon as the wheel $c$ has released the stud $f$ the same movement begins again, and so on, with the utmost precision as to the time taken.

To give the balance-wheel $d$ more momentum and greater regularity of motion, its rim may be made with projections $w$, as shown.

I claim—

1. An escapement including a balance-wheel carrying a driving-stud, and an escapement-wheel having teeth adapted to engage the said driving-stud, the flanks of the teeth being substantially straight and radial inward from the point at which they are adapted to be engaged first by the said stud, and convexed outwardly from said point, the straight portion being tangential to adjacent end of the curve.

2. An escapement including a balance-wheel carrying a driving-stud, an escapement-wheel having teeth adapted to engage said driving-stud, the flanks of the teeth being substantially straight and radial inward from the point at which they are adapted to be engaged first by said driving-stud, and convexed outwardly from said point, the straight portion being tangential to the adjacent end of the curve, and a spring controlled by the balance-wheel and carrying a locking-stud adapted to engage the teeth of the escapement-wheel.

In witness whereof I have hereunto set my hand in presence of two witnesses.

ARTHUR VICTOR CHARDON.

Witnesses:
GEO. LAUREND,
EDWARD P. MACLEAN.